(12) United States Patent
Amm et al.

(10) Patent No.: US 9,457,379 B2
(45) Date of Patent: Oct. 4, 2016

(54) ULTRASONIC MEMS TRANSMITTER

(71) Applicant: Apple Inc., Cupertino, CA (US)

(72) Inventors: David Amm, Morgan Hill, CA (US); Henry Yang, Los Gatos, CA (US); Matthew Emanuel Last, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 344 days.

(21) Appl. No.: 13/794,417

(22) Filed: Mar. 11, 2013

(65) Prior Publication Data

US 2014/0157904 A1   Jun. 12, 2014

Related U.S. Application Data

(60) Provisional application No. 61/735,527, filed on Dec. 10, 2012.

(51) Int. Cl.
*G01N 29/04* (2006.01)
*G01B 17/00* (2006.01)
(Continued)

(52) U.S. Cl.
CPC ............ *B06B 1/0292* (2013.01); *G01B 17/00* (2013.01); *G01S 7/521* (2013.01); *G01S 15/74* (2013.01); *H04R 2201/003* (2013.01)

(58) Field of Classification Search
CPC ........ A61B 8/00; A61B 8/12; A61B 8/4483; A61B 8/4488; A61B 8/0875; G01N 29/2437; G01N 29/04; G01N 29/245; G01N 29/227; G01N 29/228; G01B 17/00
USPC ......... 73/632, 627, 642; 367/92–94, 103, 87
See application file for complete search history.

(56) References Cited

U.S. PATENT DOCUMENTS 4,963,782 A * 10/1990 Bui ..................... H01L 41/183
                                                          310/334
5,483,261 A    1/1996 Yasutake
(Continued)

FOREIGN PATENT DOCUMENTS

DE    102004050794 A1    4/2006
EP     2 124 070 A2    11/2009
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Helen Kwok
(74) *Attorney, Agent, or Firm* — Morrison & Foerster LLP

(57) ABSTRACT

Ultrasonic transmitters that can be used for ranging in mobile devices are disclosed. In some examples, an ultrasonic transmitter device can be configured to transmit ultrasonic signals in multiple frequency bands. The transmitter can include multiple sets of ultrasonic transmitters, each capable of transmitting in a different frequency band. In other examples, frequency-adjustable ultrasonic transmitters can be used. The transmitters can be configured to change one or more of a length, mass, or tension of a membrane to change a resonant frequency of the membrane. In some examples, the transmitter can include a non-uniformly shaped membrane capable of vibrating at more than one resonant frequency. The ultrasonic transmitters can be included within a housing configured to control the flow of air within and out of the housing. The transmitter membrane can further be formed on a patterned substrate configured to increase the sound pressure levels produced by the transmitter.

22 Claims, 16 Drawing Sheets

(51) Int. Cl.
*B06B 1/02* (2006.01)
*G01S 7/521* (2006.01)
*G01S 15/74* (2006.01)

(56) References Cited

U.S. PATENT DOCUMENTS

| | | | |
|---|---|---|---|
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,262,946 B1* | 7/2001 | Khuri-Yakub | G10K 11/002 367/153 |
| 6,310,610 B1 | 10/2001 | Beaton et al. | |
| 6,323,846 B1 | 11/2001 | Westerman et al. | |
| 6,412,354 B1* | 7/2002 | Birchak et al. | 73/861.356 |
| 6,690,387 B2 | 2/2004 | Zimmerman et al. | |
| 6,775,388 B1* | 8/2004 | Pompei | B60B 1/0292 367/181 |
| 7,015,894 B2 | 3/2006 | Morohoshi | |
| 7,184,064 B2 | 2/2007 | Zimmerman et al. | |
| 7,291,008 B2* | 11/2007 | Habibi-Naini | 425/566 |
| 7,460,439 B2* | 12/2008 | Moon | B60B 1/0629 367/92 |
| 7,663,607 B2 | 2/2010 | Hotelling et al. | |
| 7,732,987 B2* | 6/2010 | Gao | B60B 1/0622 310/328 |
| 7,753,847 B2* | 7/2010 | Greenleaf et al. | 600/438 |
| 8,479,122 B2 | 7/2013 | Hotelling et al. | |
| 8,767,512 B2* | 7/2014 | Hajati | H01L 41/0825 367/140 |
| 9,061,320 B2* | 6/2015 | Hajati | B60B 1/0629 |
| 2004/0170086 A1* | 9/2004 | Mayer | H04R 1/083 367/178 |
| 2005/0096546 A1* | 5/2005 | Hazard | B60B 1/0292 600/447 |
| 2006/0026521 A1 | 2/2006 | Hotelling et al. | |
| 2006/0196272 A1* | 9/2006 | Sugiura et al. | 73/599 |
| 2006/0197753 A1 | 9/2006 | Hotelling | |
| 2007/0193354 A1* | 8/2007 | Felix | B60B 1/0292 73/514.32 |
| 2008/0087090 A1* | 4/2008 | Watanabe et al. | 73/597 |
| 2009/0114019 A1* | 5/2009 | Fatemi et al. | 73/587 |
| 2009/0279389 A1 | 11/2009 | Irie | |
| 2010/0251823 A1* | 10/2010 | Adachi et al. | 73/606 |
| 2010/0268058 A1* | 10/2010 | Chen | A61B 5/0086 600/407 |
| 2010/0300208 A1* | 12/2010 | Fujii et al. | 73/724 |
| 2010/0327695 A1* | 12/2010 | Goel | B60B 1/0622 310/320 |
| 2011/0209558 A1* | 9/2011 | Sugiura et al. | 73/861.18 |
| 2012/0017685 A1* | 1/2012 | Chancellor et al. | 73/632 |
| 2012/0103096 A1* | 5/2012 | Kandori | 73/632 |
| 2012/0176002 A1* | 7/2012 | Kim | H04R 3/04 310/317 |
| 2012/0269031 A1* | 10/2012 | Huffman et al. | 367/7 |

FOREIGN PATENT DOCUMENTS

| | | |
|---|---|---|
| EP | 2 124 070 A3 | 11/2009 |
| EP | 2 520 918 A2 | 11/2012 |
| EP | 2 520 918 A3 | 11/2012 |
| JP | 2000-163031 A | 6/2000 |
| JP | 2002-342033 A | 11/2002 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

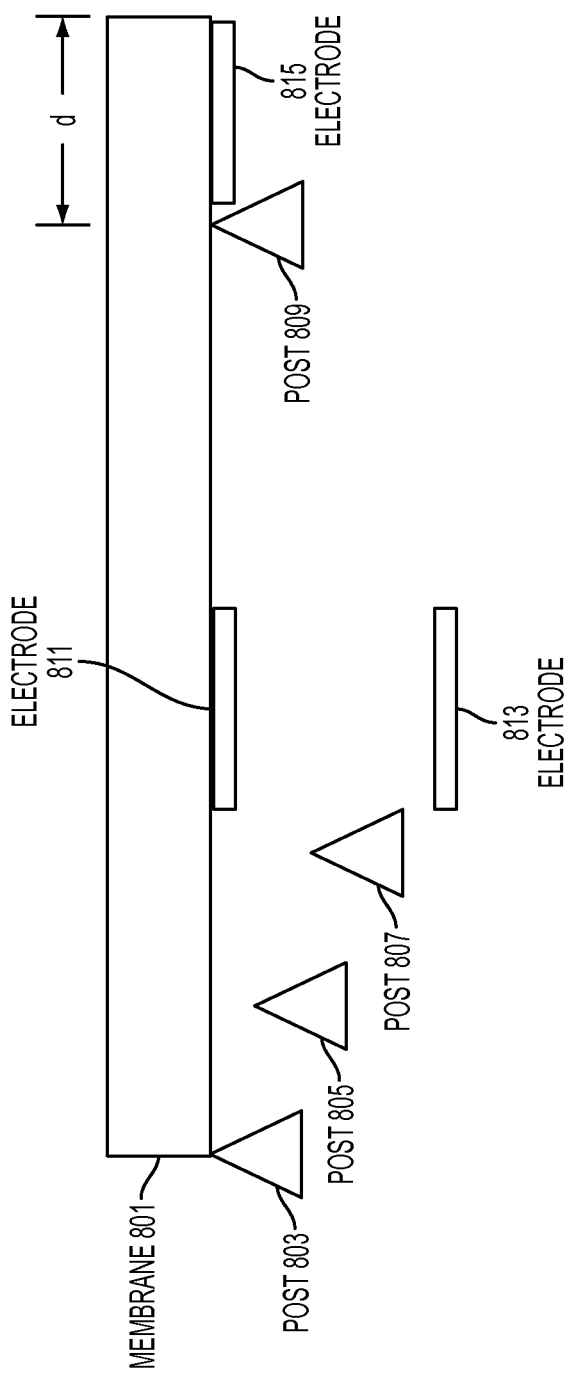

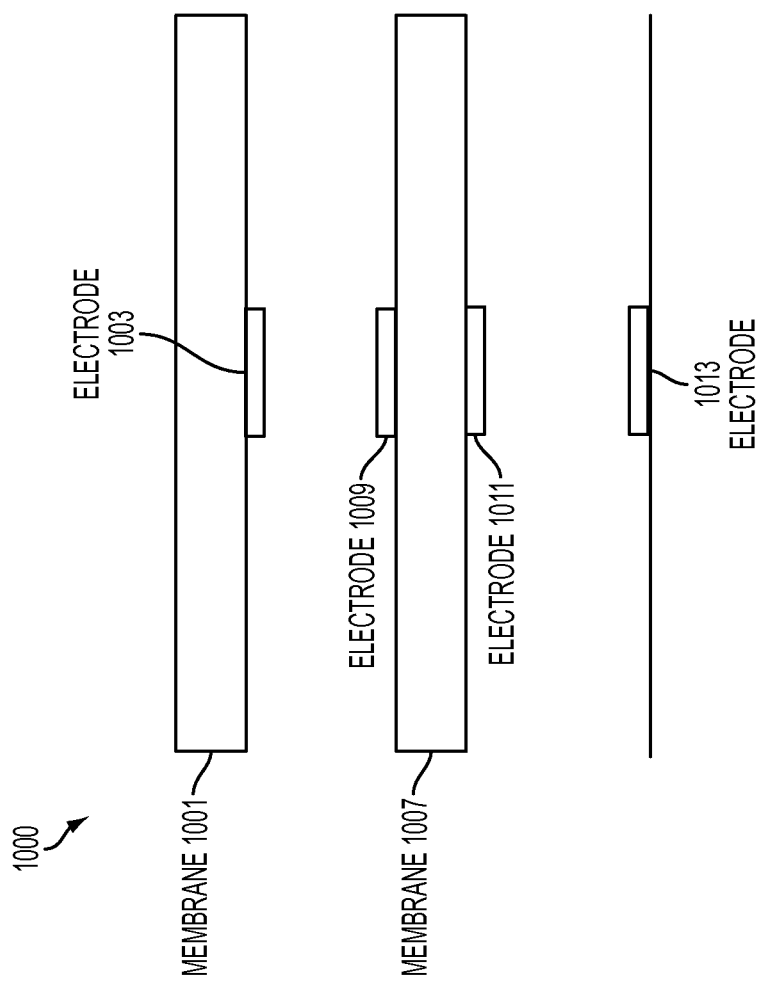

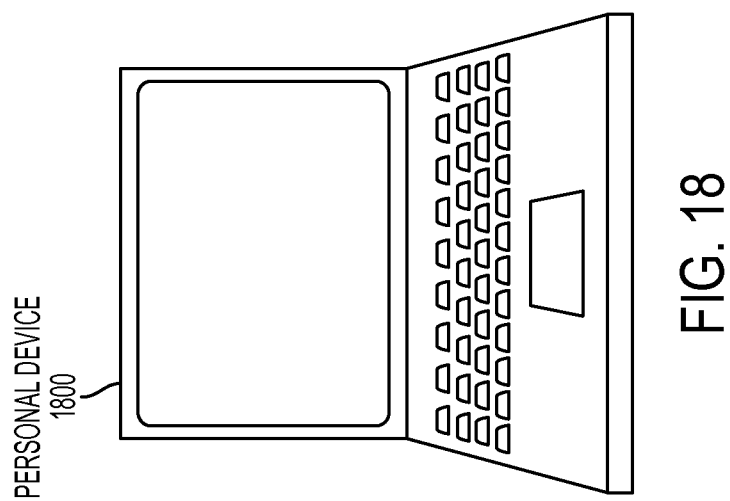

ULTRASONIC MEMS TRANSMITTER

FIELD

This relates generally to ultrasonic ranging and, more specifically, to ultrasonic microelectromechanical systems (MEMS) transmitters for ultrasonic ranging.

BACKGROUND

Mobile devices are very popular because of their portability, convenience, and versatile functionality. Such devices can include touch functionality that allows a user to perform various functions by touching a touch sensor panel using a finger, stylus, or other object at a location often dictated by a user interface (UI) being displayed by a display device; display functionality that allows a user to view on the display device a variety of information, either passively, such as reading text on the UI, or interactively, such as playing games or chatting in real time to another user; and communication functionality that allows a user to share video, audio, textual, and graphical data with others, through phone call, email, text messaging, chat rooms, music, streaming video, and the like.

Current networks allow mobile devices to connect to other devices in order to share information. In some cases, the devices can be far away from each other. In other cases, the devices can be in close proximity, within transmission capabilities of the individual device.

Taking advantage of device capabilities to easily and quickly facilitate communication therebetween when the devices are in close proximity is desirable.

SUMMARY

This relates to ultrasonic transmitters that can be used for ranging in mobile devices. For example, the ultrasonic ranging can be used to find proximate devices using ultrasound so as to communicate and share data between devices. In some examples, an ultrasonic transmitter package can be configured to transmit ultrasonic signals in multiple frequency bands. The transmitter package can include multiple sets of ultrasonic transmitters, each capable of transmitting in a different frequency band. In other examples, frequency-adjustable ultrasonic transmitters can be used. The transmitters can be configured to change one or more of a length, mass, or tension of a membrane in order to change a resonant frequency of the membrane. In some examples, transmitters can include non-uniformly shaped membranes capable of vibrating at more than one resonant frequency. The transmitter can further include one or more electrodes to adjust the length or width of the membrane. In some examples, the ultrasonic transmitters can be included within a housing configured to control the flow of air within and out of the housing. This can cause the transmitter to produce higher sound pressure levels. In some examples, the transmitter membrane can be formed on a patterned substrate configured to increase the sound pressure levels produced by the transmitter.

This summary is provided to introduce concepts in simplified form that are further described below in the Detailed Description. This summary is not intended to identify key features or essential features of the disclosed subject matter and is not intended to describe each disclosed embodiment or every implementation of the disclosed subject matter.

BRIEF DESCRIPTION OF THE DRAWINGS

FIG. 8 illustrates a length and tension-adjustable ultrasonic transmitter according to various examples of the disclosure.

FIG. 10 illustrates a mass-adjustable ultrasonic transmitter according to various examples of the disclosure.

FIG. 18 illustrates a laptop computer that can include an ultrasonic transmitter according to various examples of the disclosure.

DETAILED DESCRIPTION

In the following description, reference is made to the accompanying drawings in which it is shown by way of illustration specific examples of the disclosure that can be practiced. It is to be understood that other examples can be used and structural changes can be made without departing from the scope of the various examples of the disclosure.

This relates to ultrasonic transmitters that can be used for ranging in mobile devices. For example, the ultrasonic ranging can be used to find proximate devices using ultrasound so as to communicate and share data between devices. In some examples, an ultrasonic transmitter device can be configured to transmit ultrasonic signals in multiple frequency bands. The transmitter can include multiple sets of ultrasonic transmitters, each capable of transmitting in a different frequency band. In other examples, frequency-adjustable ultrasonic transmitters can be used. The transmitters can be configured to change one or more of a length, mass, or tension of a membrane in order to change a resonant frequency of the membrane. In some examples, transmitters can include non-uniformly shaped membranes capable of vibrating at more than one resonant frequency. The transmitter can further include one or more electrodes to adjust the length or width of the membrane. In some examples, the ultrasonic transmitters can be included within a housing configured to control the flow of air within and out of the housing. This can cause the transmitter to produce higher sound pressure levels. In some examples, the transmitter membrane can be formed on a patterned substrate configured to increase the sound pressure levels produced by the transmitter.

Figure 1:
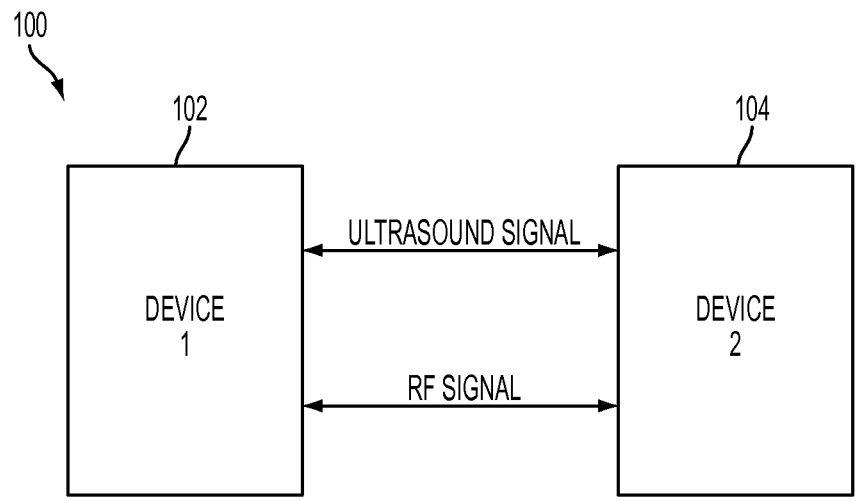
FIG. 1 illustrates ultrasonic ranging between mobile devices according to various examples of the disclosure.

FIG. 1 illustrates ultrasound ranging between two mobile devices. In the example of FIG. 1, system 100 can include device 102 and device 104 in close proximity. Device 102 can transmit ultrasonic signals to device 104 to determine the distance or range to device 104. Similarly, device 104 can transmit ultrasonic signals to device 102. Either device 102, 104 can initiate the transmission of the ultrasonic signals, while the other device can respond with transmission of its ultrasonic signals. The initiating device can use the two sets of ultrasonic signals, e.g., the signals it sent and the signals it received from the other device, and time of flight of the ultrasonic signals to determine the range between the devices. In some examples, both devices 102, 104 can be mobile. In some examples, either device 102, 104 can be mobile, while the other is fixed at a location. In some examples, both devices 102, 104 can be at fixed locations.

In addition to ultrasonic signals, device 102 can also transmit radio frequency (RF) signals to device 104 to assist with ranging, to communicate its presence and other information to device 104, and/or to synchronize the two devices' clocks. Similarly, device 104 can transmit RF signals to device 102.

Device 102 can further transmit data, e.g., transaction data, channel and frequency data, device identification data, and so on, to device 104 in the ultrasound, RF, or other electromagnetic signals, such as optical signals. Similarly, device 104 can transmit data to device 102.

Although the example of FIG. 1 shows only two devices, it should be understood that any number of devices, e.g., 3, 4, or more, in close proximity can establish a de facto communication network, using ultrasound signals to determine range of devices, RF signals to synchronize devices, and either or both signals to transfer relevant data, depending on the capabilities of the devices. With a larger number of devices, ultrasound signals can be used for trilateration of all the devices, which can result in a three-dimensional map of the devices. In some examples, with the larger number of devices, one device can be a centralized device to gather information from and share information with the other devices, and estimate the three-dimensional map and orientations of the devices.

It should further be understood that other electromagnetic signals, e.g., infrared (IR), visible light, and the like, can also be used with ultrasound for ranging of proximate devices according to various examples.

Figure 2:
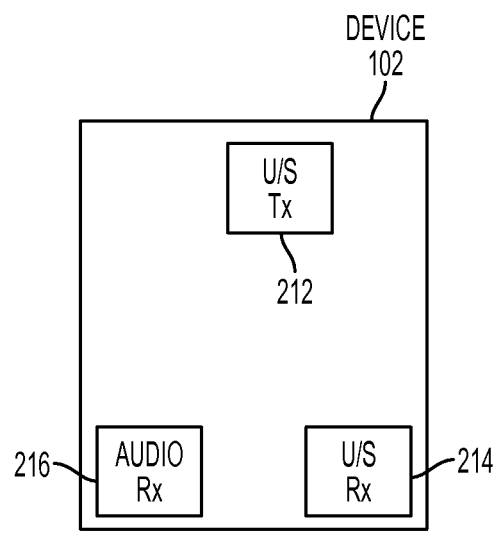
FIG. 2 illustrates a mobile device capable of ultrasonic ranging according to various examples of the disclosure.

FIG. 2 illustrates a mobile device capable of ultrasonic ranging. In the example of FIG. 2, device 102 can include ultrasonic transmitter 212 to transmit ultrasonic signals to proximate devices. In some examples, as will be explained in greater detail below, the ultrasonic transmitter 212 can include a transducer or any other suitable device for generating and transmitting ultrasonic signals. Device 102 can also include ultrasonic receiver 214 to receive ultrasonic signals from proximate devices. In some examples, the ultrasonic receiver 214 can be a microphone or any other suitable device for detecting ultrasonic signals.

Although the example of FIG. 2 shows the transmitter and receiver as separate components, it should be understood that the two can be combined as a transceiver to both transmit and receive ultrasonic signals. It should further be understood that more than one transmitter and/or receiver can be used to provide stereo capabilities for the device. For example, multiple ultrasonic receivers can receive an ultrasonic signal at slightly different times, such that the time differences can be used to determine the relative orientation (or angle) of the proximate device.

In addition to ultrasonic components, device 102 can include an audio receiver 216 for detecting audio signals, e.g., voice, music, and other audible signals that can be inputted to the device.

Figure 3:
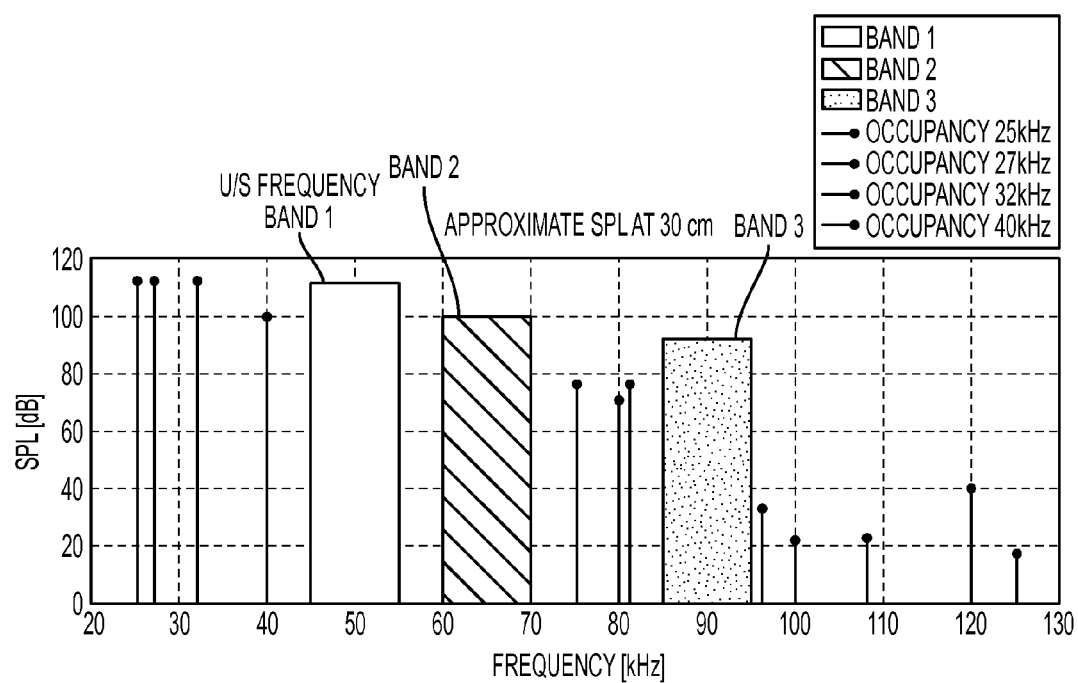
FIG. 3 illustrates ultrasonic frequency bands that can be used for ranging according to various examples of the disclosure.

Preferably, the frequencies of the ultrasonic signals used in finding a device range fall within a band that can provide adequate performance in the presence of any narrow or wideband interference sources and in typical indoor and outdoor conditions, e.g., temperature and humidity, and that can produce higher sound pressure levels (SPL). FIG. 3 depicts example ultrasonic frequency bands that satisfy these preferences. In the example of FIG. 3, three frequency bands of operation with minimum SPL at 30 cm are shown—band 1 at 45-55 kHz, 110 dB SPL; band 2 at 60-70 kHz, 100 dB SPL; and band 3 at 85-95 kHz, 90 dB SPL. Each band is approximately 10 kHz wide and provides at least 2 frequency channels (e.g., 5 frequency channels spaced 2.5 kHz apart). These frequency bands can be preferable because of (a) generally low presence (or occupancy) of other narrow or wideband interference sources (highest occupancy being at other frequencies, e.g., 25, 27, 32, and 40 kHz), (b) low attenuation of signals at typical indoor humidity levels, e.g., humidity between 30-50%, and (c) high SPL.

Other configurations of the frequencies for ultrasonic signals used in ranging are also possible. In some examples, a single wideband can be used. In some examples, two wider frequency bands can be used. In some examples, more than three narrower frequency bands can be used. In some examples, more than 5 frequency channels can be used within each band. In some examples, less than 5 frequency channels can be used within each band. In some examples, the channels in each band can be contiguous. In some examples, the channels in each band can be separate. In some examples, the frequency bands can be spaced closer together. In some examples, the frequency bands can be spaced further apart.

Various types of transmissions can be used to transmit ultrasonic signals for ranging. For example, a tone burst signal can be used to transmit the ultrasonic signals, in which a constant tone amplitude of some duration is transmitted. Because the tone burst signal, in some examples, can be sensitive to interference, pulse shaping can be applied to the burst signal to provide a smoother transition between low and high voltages and to somewhat decrease its sensitivity to interference. In another example, a chirping signal can be used to transmit the ultrasonic signals, in which a sine-like wave of some duration is transmitted, where the signal can start at a lower frequency and then ramp up to higher frequencies over the duration of the signal. Because of the frequency changes, the chirping signal can be less sensitive to interference. The chirping signal can also provide higher precision ranging. In another example, a CDMA signal can be used to transmit the ultrasonic signals to allow multiple devices to transmit over the same channel or within the same frequency band. It should be understood that other transmission types can be used that are capable of transmitting ultrasonic signals for ranging devices.

To generate the ultrasonic signals described above, various types of transmitters can be used. For instance, in some examples, ultrasonic MEMS transmitters can be used.

Figure 4:
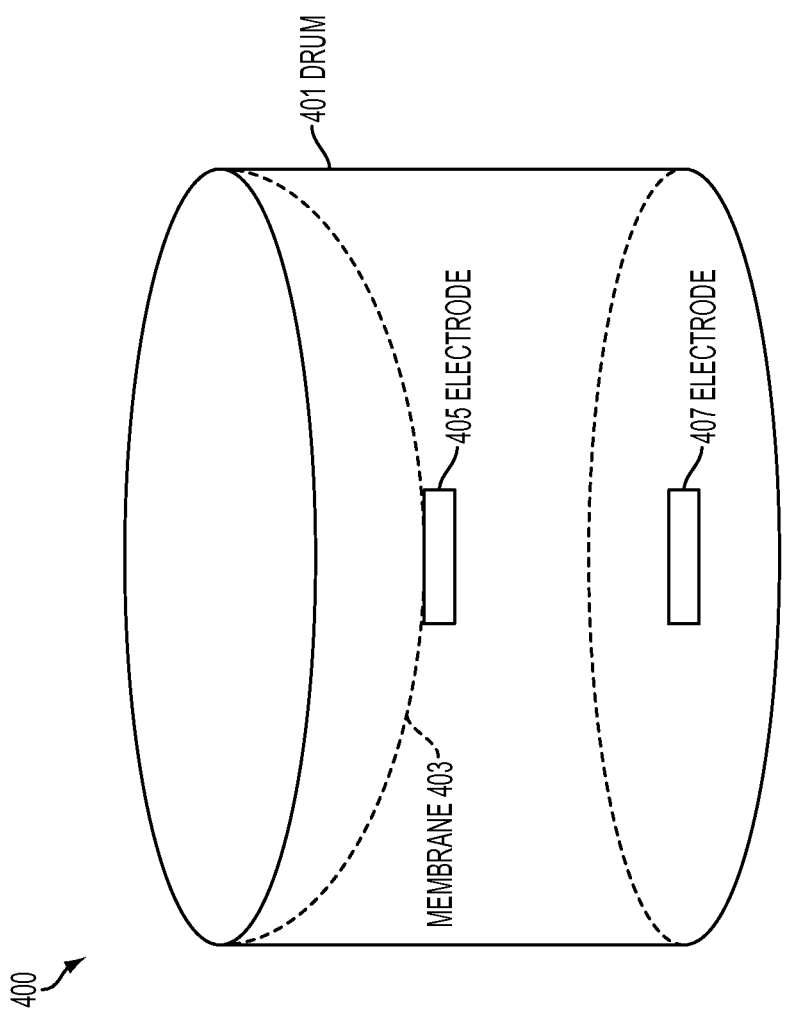
FIG. 4 illustrates an ultrasonic transmitter according to various examples of the disclosure.

FIG. 4 illustrates a cross-sectional view of a MEMS ultrasonic transmitter 400 that can be used in a mobile device for ranging. In the example of FIG. 4, transmitter 400 can include a drum 401 having a membrane 403 positioned over one end of the drum. Transmitter 400 can further include a first electrode 405 coupled to the underside of membrane 403. A second electrode 407 can also be positioned within drum 401, as shown in FIG. 4. In this configuration, an electrical signal can be applied to electrode 407, causing a force to be exerted on electrode 405. If the frequency of the applied electrical signal corresponds to the resonant frequency of membrane 403, membrane 403 can be caused to vibrate by moving up and down in a spring-like fashion. This motion can create changes in air pressure around transmitter 400, causing a sound having a frequency corresponding to the motion of membrane 403 to be generated.

Figure 5:
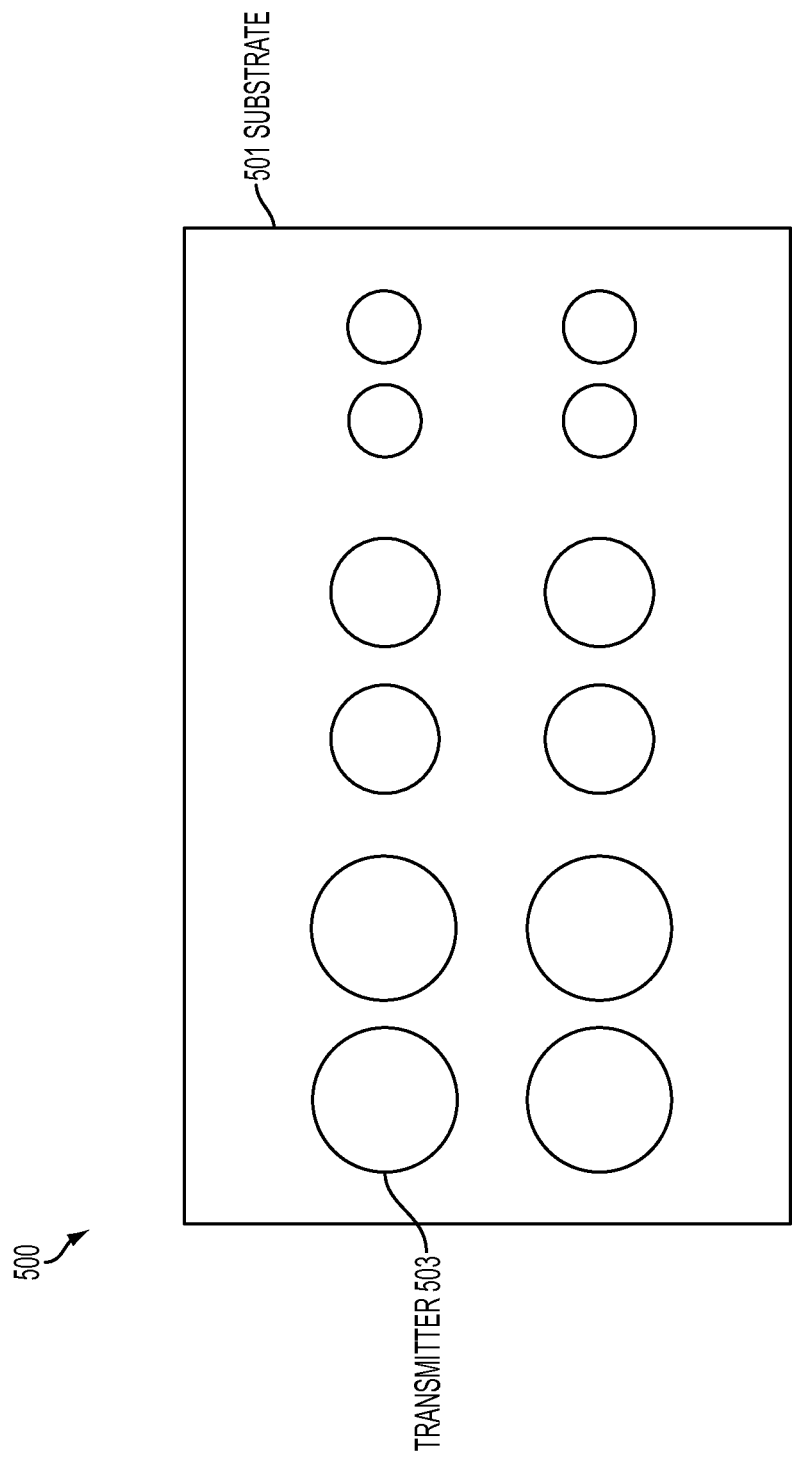
FIG. 5 illustrates a transmitter package including multiple sets of ultrasonic transmitters according to various examples of the disclosure.

The physical characteristics of MEMS transmitters, such as transmitter 400, limit the range of frequencies that can be generated by the device. Typical MEMS transmitters can efficiently generate signals within a narrow spread within a single frequency band. Thus, to create multiple bands of signals, each having multiple channels as shown in FIG. 3, transmitters having different physical properties can be used. For example, FIG. 5 illustrates an example 3-band MEMS transmitter package 500 that can be used to generate signals having frequency characteristics similar or identical to those shown in FIG. 3. Transmitter package 500 can generally include a single die substrate 501 having multiple transmitters 503 formed thereon. Transmitters 503 can include transmitters similar or identical to transmitter 400 shown in FIG. 4. However, the transmitter device 500 can include two or more (e.g., three) sets of transmitters 503 of varying sizes that are sensitive to different frequencies. For example, referring back to FIG. 3 in which there are three frequency bands, substrate 501 can include a first set of transmitters 503 capable of generating ultrasonic signals within frequency band 1, e.g., 45-55 kHz; a second set of transmitters 503 capable of generating ultrasonic signals within band 2, e.g., 60-70 kHz; and a third set of transmitters 503 capable of generating ultrasonic signals within band 3, e.g., 85-95 kHz. Forming transmitters 503 within one ultrasonic transmitter package advantageously provides a more robust transmitter within a space constrained device. Additionally, by forming transmitters 503 on a single die, lateral (x/y) dimensions can be easily tailored to each transmitter type (length & width) to create the different frequency responses. In this way, the MEMs process and film thicknesses are identical or at least substantially similar for each transmitter.

In some examples, the sets of transmitters 503 can be formed on separate die substrates 501. For example, two sets of transmitters 503 can be formed on a single die substrate 501 while a third set of transmitters 503 can be formed on a second die substrate. In another example, each set of transmitters 503 can be formed on its own die substrate 501. By forming transmitters 503 on separate dies, different MEMs processes and film thickness can be chosen to enable the different frequency ranges. For example, the lateral size dimensions could be the same, or also varied among the three transmitter designs.

While the transmitter package 500 can be effectively used to generate 3-bands of ultrasonic signals, the size of transmitter package 500 can be relatively large due to the use of multiple sets of transmitters 503 to generate the different frequency bands.

FIGS. 6-13 illustrate transmitters that can be adjusted to create multiple frequencies. Since the resonant frequency of a membrane of a MEMS transmitter depend at least in part on the mass, length, membrane thickness, and tension of the membrane, the transmitters shown in FIGS. 6-13 include various mechanisms to adjust one or more of those factors. Using these transmitters, fewer transmitters can be used to generate the same signals produced by transmitter package 500, thereby reducing the size of package 500.

Figure 6:
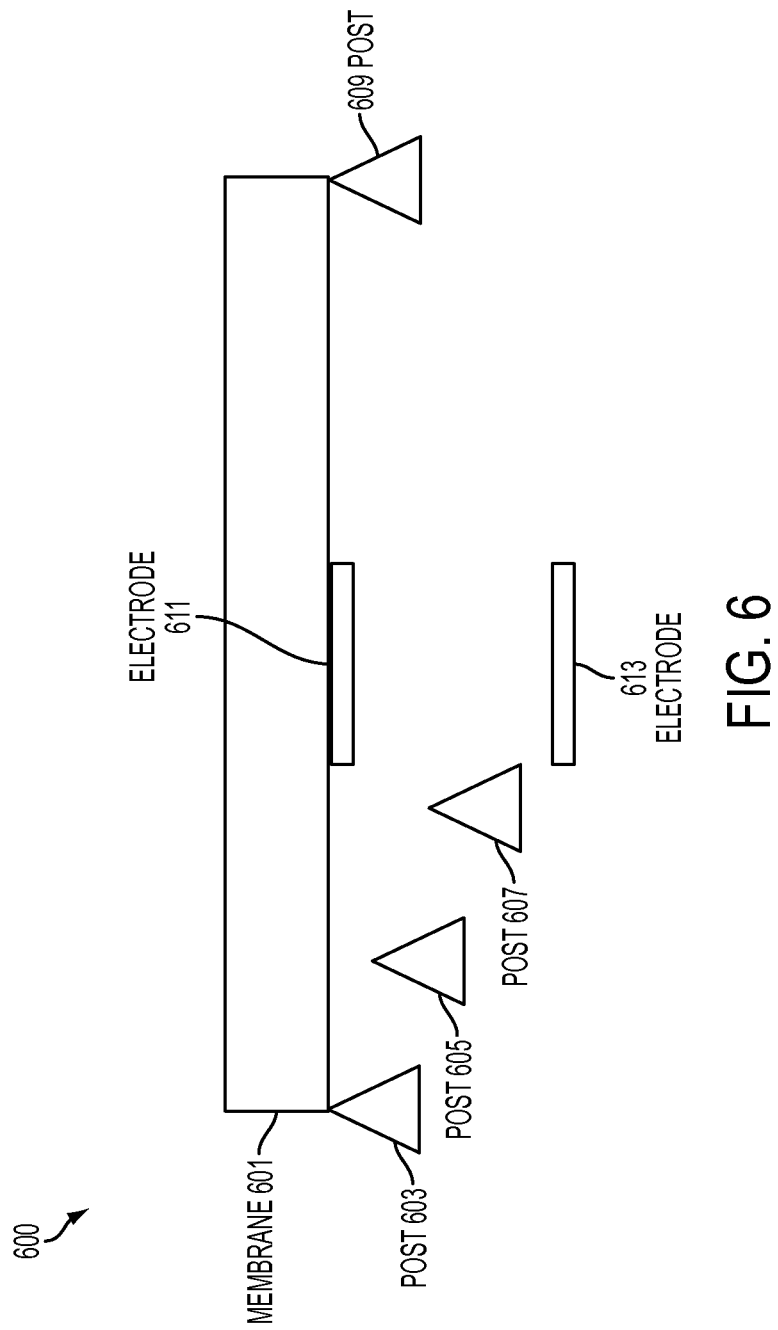
FIG. 6 illustrates a length-adjustable ultrasonic transmitter according to various examples of the disclosure.

FIG. 6 illustrates a cross-section view of one example adjustable transmitter 600 that can be used to generate signals having different frequencies. Transmitter 600 can include a membrane 601 supported by posts 603 and 609 at each end. Transmitter 600 can further include posts 605 and 607 beneath membrane 601 and positioned closer to the center of membrane 601. As shown in FIG. 6, the height of the posts decrease as the posts get closer to the center of membrane 601. In this configuration, the movable length of membrane 601 can be adjusted by pulling down on membrane 601, causing the bottom of membrane 601 to further contact post 605 or posts 605 and 607. In doing so, the effective length of membrane 601 can be changed, since portions of membrane 601 outside of the inner-most contacting post will not vibrate. To pull down on membrane 601, the DC voltage component of the signal applied to electrodes 613 of transmitter 600 can be increased, resulting in a larger attractive force between the electrodes 611 and 613. Since the resonant frequency of membrane 601 can depend in part on the length of the membrane, the frequency of sound generated by transmitter 600 can be adjusted by selectively changing the DC voltage of the signal applied to the electrodes. For example, applying a signal having a larger DC voltage component to electrode 613 can cause membrane 601 to contact post 605, thereby shortening the length of membrane 601. The shorter length increases the resonant frequency of membrane 601. Similarly, applying a signal having a smaller DC voltage component to electrode 613 can cause membrane 601 to disengage from post 605, thereby increasing the length of membrane 601. The larger length decreases the resonant frequency of membrane 601. Alternatively, additional peripheral electrodes, located closer to posts 605 and 607, can be used and biased with DC voltage to pull down the membrane into contact with posts 605 or 607.

Figure 7:
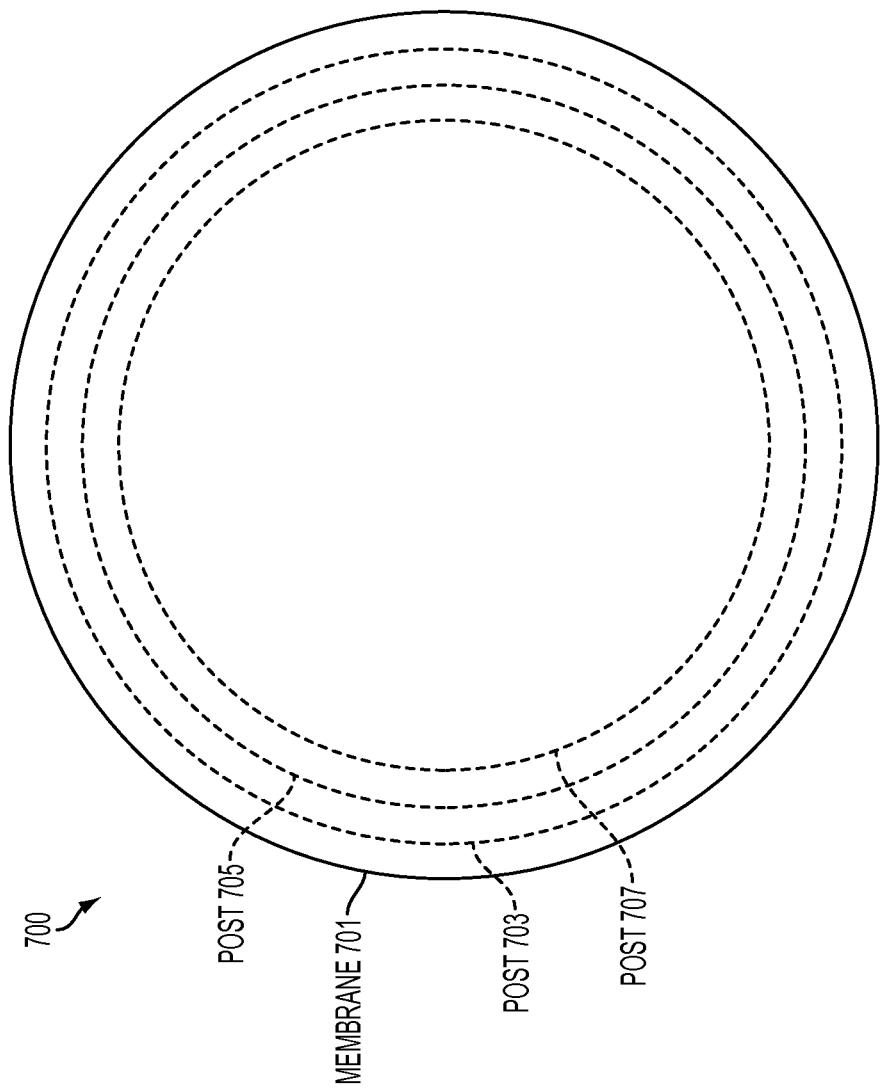
FIG. 7 illustrates another length-adjustable ultrasonic transmitter according to various examples of the disclosure.

FIG. 7 illustrates a top-view of another example adjustable transmitter 700 that can be used to generate signals having different frequencies. Transmitter 700 can include a circular membrane 701. Positioned below membrane 701 can be one or more posts 703, 705, and 707. Similar to transmitter 600, the height of the posts can decrease as the posts get closer to the center of membrane 701. Additionally, similar to transmitter 600, the effective length of membrane 701 can be changed by adjusting a DC voltage level of the signal applied to the electrodes of transmitter 700. In this way, the electrode coupled to the underside of membrane 701 can pull down on membrane 700, causing portions of membrane 701 to contact posts one or more of 703, 705, and 707. Since the resonant frequency of membrane 701 depends in part on the length of the membrane, the frequency of sound generated by transmitter 700 can be adjusted by selectively changing the DC voltage of the signal applied to the electrodes.

FIG. 8 illustrates cross-section view of another example adjustable transmitter 800 that can be used to generate signals having different frequencies. Transmitter 800 can be similar to transmitter 600, except that at least one of the posts 809 can be located away from the edge of membrane 801. In particular, post 809 is a distance d away from the edge. This additional distance d of membrane 801 can be used to fine-tune the frequency generated by transmitter 800. For example, the effective length of membrane 801 can be adjusted by changing the DC voltage component of the signal applied to electrode 813 as described above with respect to FIG. 6. This change can result in a relatively large change in the frequency of the sound generated by transmitter 800. For instance, a change in effective length of membrane 801 can cause a change in frequency between the frequency bands shown in FIG. 3. To change between channels within the same frequency band, an electrode placed to the right of post 809 can be used to pull down on membrane 801, thereby increasing the tension in membrane 801. Since the resonant frequency of membrane 801 depends in part on the tension of the material, the frequency of sound generated by transmitter 800 can be adjusted by selectively changing the DC voltage component of a signal applied to an electrode below the 815. For example, increasing the DC voltage component can cause an increase in tension in membrane 801, thereby increasing the resonant frequency of membrane 801. Similarly, decreasing the DC voltage component can cause a decrease in tension in membrane 801, thereby decreasing the resonant frequency of membrane 801.

Figure 9A:
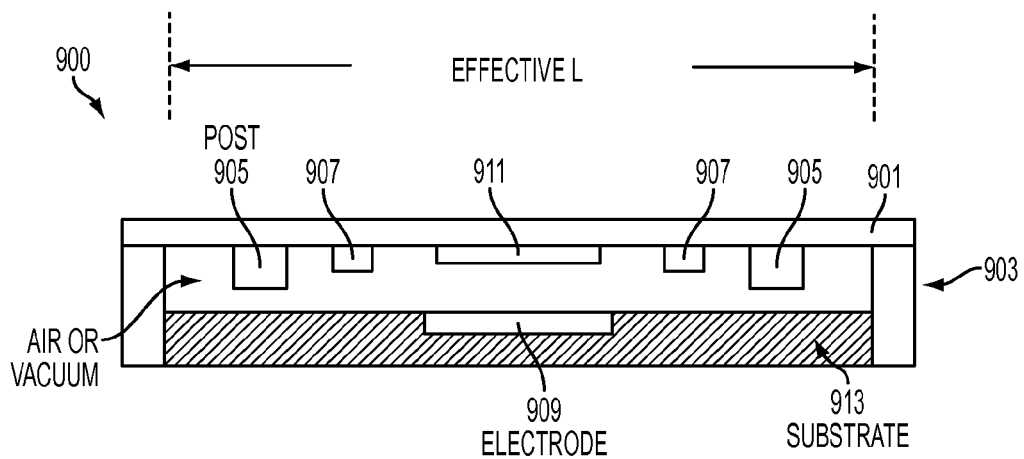
FIGS. 9A-C illustrate a length-adjustable ultrasonic transmitter according to various examples of the disclosure.
Figure 9B:
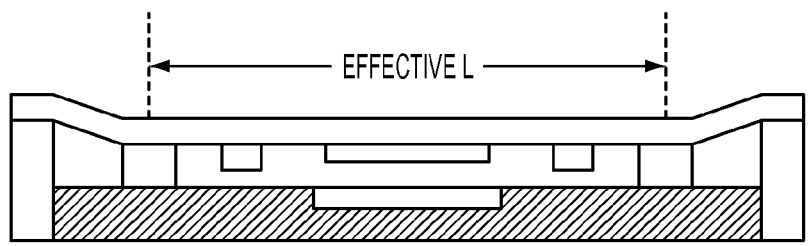
Figure 9C:
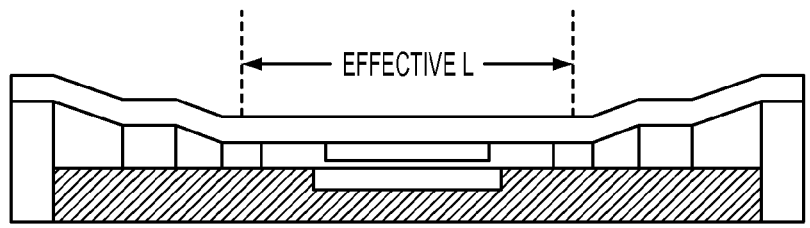

FIGS. 9A-C illustrate a cross-section of another example adjustable transmitter 900 that can be used to generate signals having different frequencies. Transmitter 900 is similar to transmitter 600, except that the posts are built into membrane 901 of the transmitter. In particular, membrane 901 can include posts 905 and 907 positioned on the underside of membrane 901. As shown in the various illustrations of FIG. 9, the effective length L of membrane 901 can be adjusted by changing a DC voltage level of the signal applied to electrode 909. In this way, electrodes 909, 911 can be caused to pull down on membrane 901, causing portions of membrane 901 to contact posts 905 and 907. Since the resonant frequency of membrane 901 can depend in part on the length of the membrane, the frequency of sound generated by transmitter 900 can be adjusted by selectively changing the DC voltage component of the signal applied to electrode 909. In some examples, an air or vacuum can be formed between membrane 901, drum 903, and substrate 913.

FIG. 10 illustrates a cross-section view of another example adjustable transmitter 1000 that can be used to generate signals having different frequencies. Transmitter 1000 can include a first membrane 1001 having a first electrode 1003 coupled to the bottom of the first membrane 1001. Transmitter 1000 can further include a second membrane 1007 having a second electrode 1009 and third electrode 1011 coupled to opposite sides of second membrane 1007. Transmitter 1000 can further include a fourth electrode 1013 coupled to the bottom of the transmitter 1000 drum. In operation, a first frequency can be generated by applying a signal having a first DC voltage component to second electrode 1009. The signal having the first DC voltage component applied to second electrode 1009 can cause first membrane 1001 to be physically separated from second membrane 1007. Thus, when a signal is applied to fourth electrode 1013, second membrane 1007 may vibrate at the first frequency. To generate a signal having a second frequency, a signal having a second DC voltage component can be applied to second electrode 1009. The signal having the second DC voltage component applied to second electrode 1009 can cause electrodes 1003 and 1009 to be pulled together to couple together first membrane 1001 and second membrane 1007. Since the resonant frequency of membrane 1007 depends in part on the mass of the membrane, the frequency of sound generated by transmitter 1000 can be adjusted by adding the mass of first membrane 1001 to second membrane 1007. Thus, when a signal is applied to fourth electrode 1013, second membrane 1007 and first membrane 1001 may vibrate at the second frequency. In this example, the second frequency is lower than the first frequency since an increase in mass decreases the resonant frequency.

Figure 11:
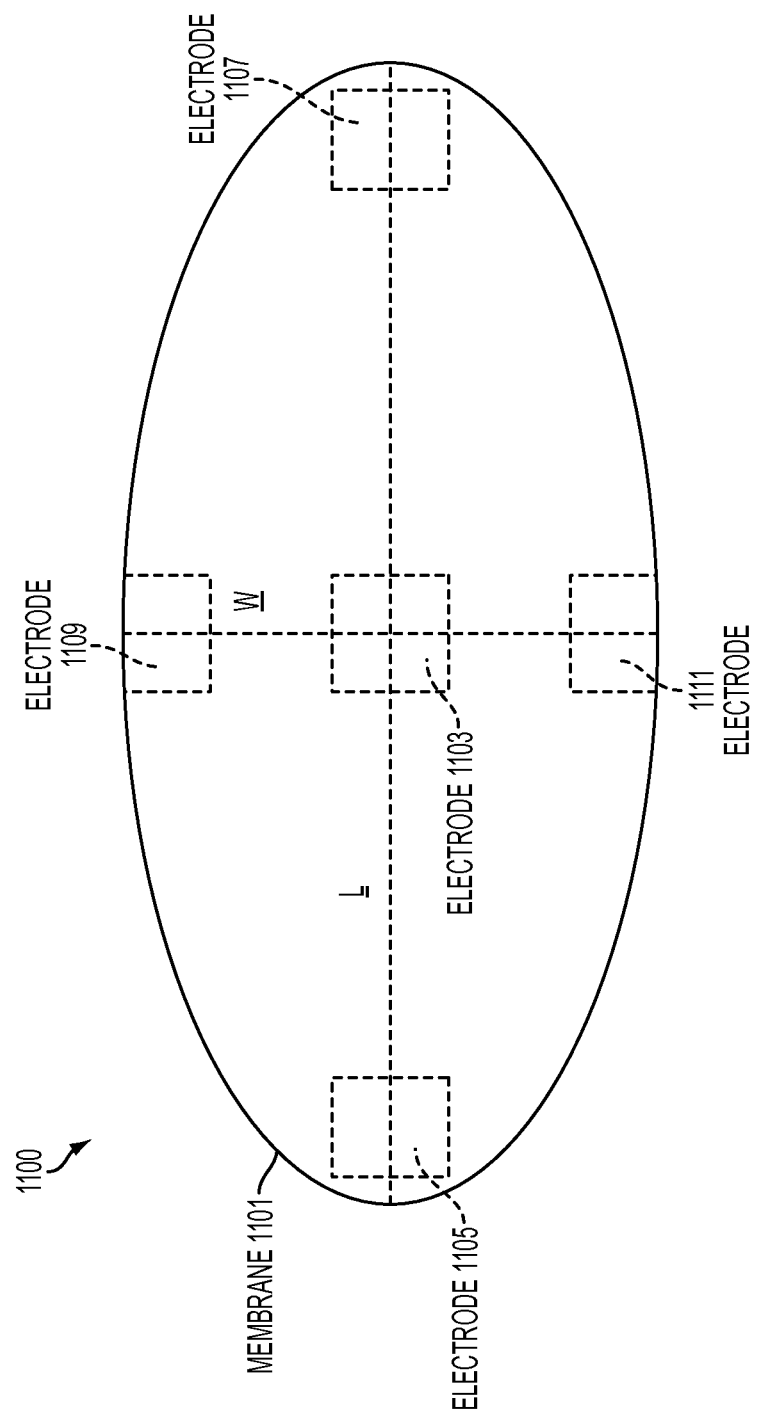
FIG. 11 illustrates a non-uniformly shaped ultrasonic transmitter according to various examples of the disclosure.

FIG. 11 illustrates a top view of another example adjustable transmitter 1100 that can be used to generate signals having different frequencies. Transmitter 1100 can include membrane 1101 having a non-uniform shape. In particular, membrane 1101 can have an oval shape and can include a length L that is not equal to a width W. Since the resonant frequency at which membrane 1101 can vibrate depends in part on the length (or width) of the membrane, the non-uniformity of membrane 1101 can allow it to vibrate at multiple frequencies. By applying a signal to an electrode of transmitter 1100 at a frequency corresponding to length L, electrode 1103 on the underside of membrane 1101 can cause the membrane to vibrate at a first frequency. By applying a signal to the electrode of transmitter 1100 at a frequency corresponding to the width W, membrane 1101 can vibrate at a second frequency.

In some examples, transmitter 1100 can optionally include electrodes 1105/1107 and or 1109/1111. Electrodes 1105 and 1107 can be used to change the first frequency (corresponding to length L) by pulling down on the edges of membrane 1101, thereby changing the effective length L. Similarly, electrodes 1109 and 1111 can be used to change the second frequency (corresponding to width W (pulling down on the edges of membrane 1101, thereby changing the effective width W.

Figure 12:
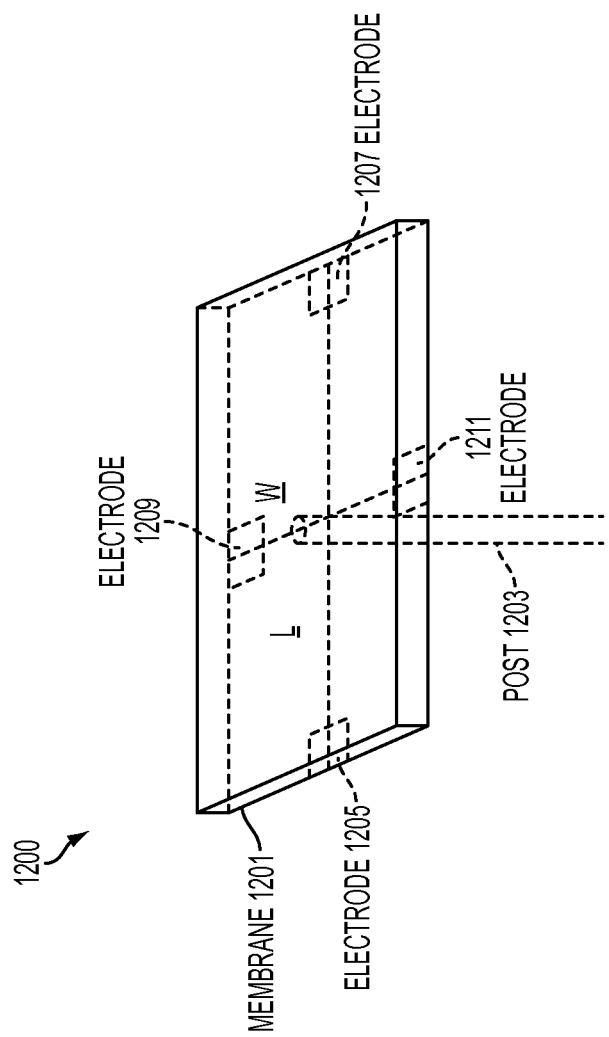
FIG. 12 illustrates another non-uniformly shaped ultrasonic transmitter according to various examples of the disclosure.

FIG. 12 illustrates another example adjustable transmitter 1200 that can be used to generate signals having different frequencies. Similar to transmitter 1100, transmitter 1200 includes membrane 1201 having a length L that is different from width W. Membrane 1201 can be supported by post 1203. Transmitter 1200 can be operated in a manner similar to that described above with respect to transmitter 1100 to generate signals at difference frequencies.

In some examples, transmitter 1200 can optionally include electrodes 1205/1207 and or 1209/1211. Electrodes 1205 and 1207 can be used to change the first frequency (corresponding to length L) by pulling down on the edges of membrane 1201, thereby changing the effective length L. Similarly, electrodes 1209 and 1211 can be used to change the second frequency (corresponding to width W) by pulling down on the edges of membrane 1201, thereby changing the effective width W.

Figure 13:
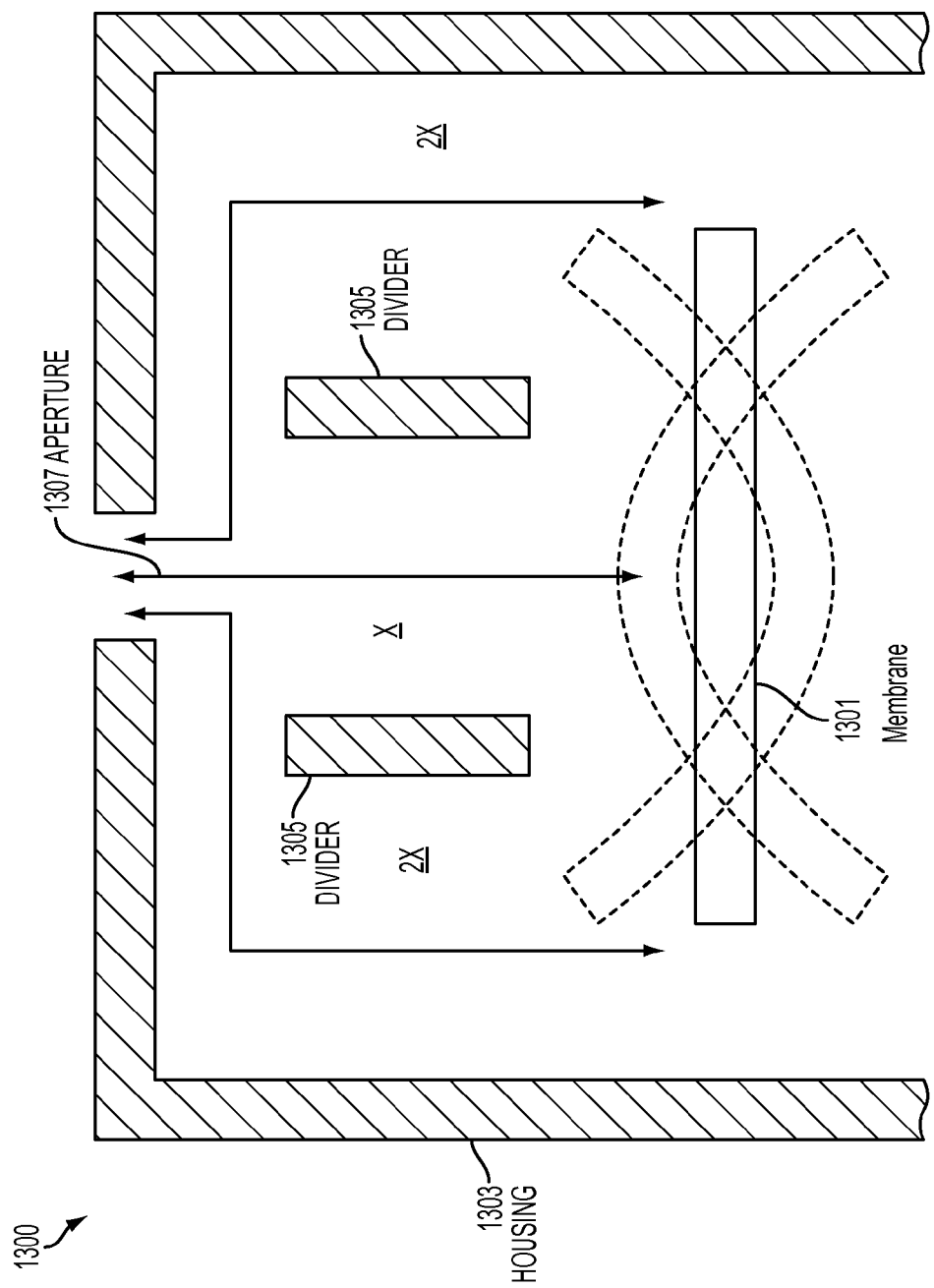
FIG. 13 illustrates a housing for an ultrasonic transmitter according to various examples of the disclosure.

FIG. 13 illustrates a cross-section view of an exemplary housing 1303 for transmitter 1300 that can be used to generate ultrasonic signals. Transmitter 1300 includes membrane 1301 enclosed within housing 1303. Transmitter 1300 further includes dividers 1305. Dividers 1305 can be used to control the flow of air within and out of housing 1303. In some examples, divider 1305 can be positioned within housing 1303 such that the distance X between the center of membrane 1301 and aperture 1307 is half the distance between the distance 2× between the edges of membrane 1301 and aperture 1307. In this way, the interference between the flow of air along the edges of drum 1303 and the air flow through the center of drum is reduced. The drum and divider design of transmitter 1300 can be used with any of the other transmitters disclosed herein.

Figure 14:
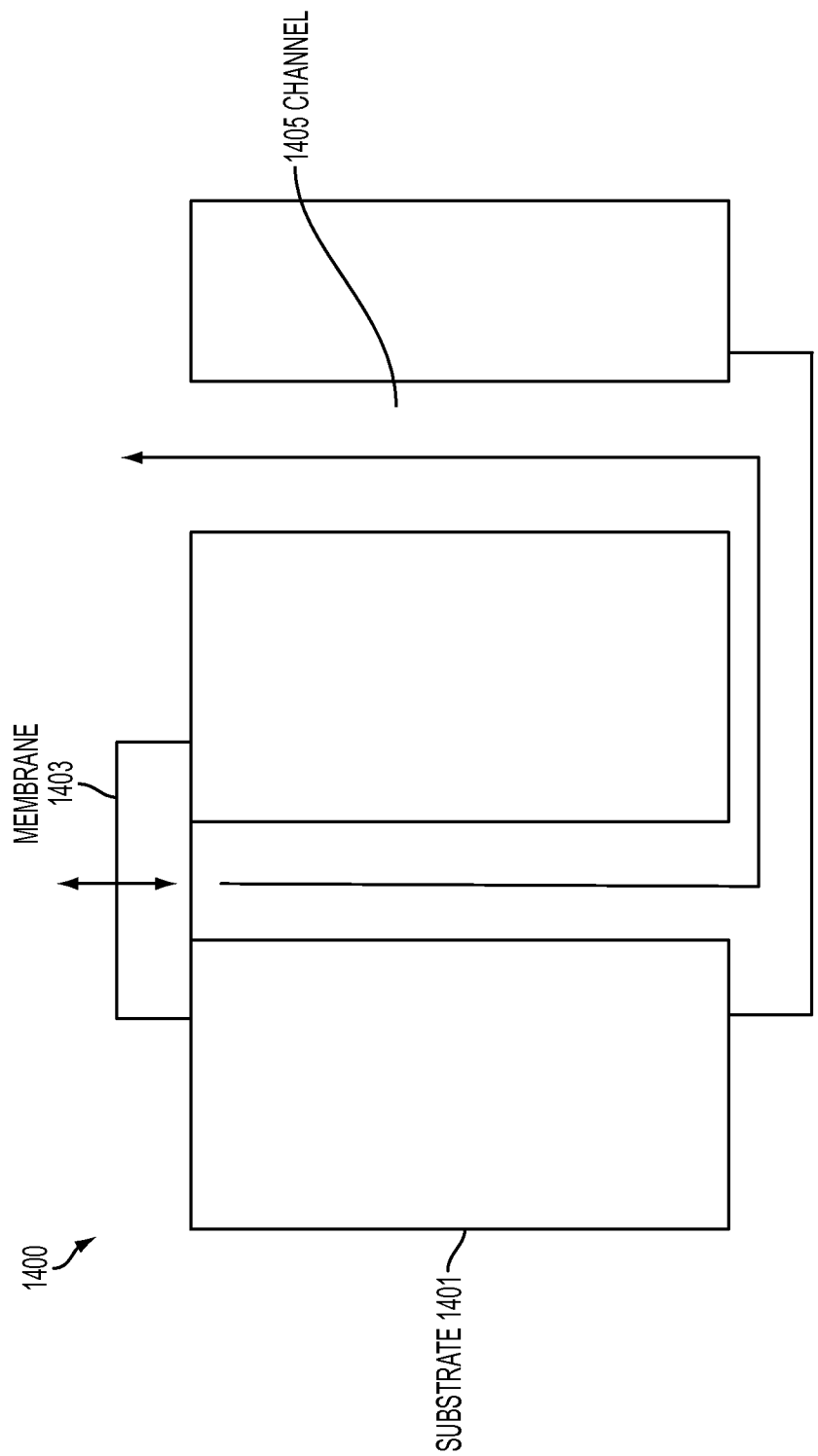
FIG. 14 illustrates a patterned die substrate for an ultrasonic transmitter according to various examples of the disclosure.

FIG. 14 illustrates a cross-section view of an exemplary patterned die substrate for transmitter 1400 that can be used to generate ultrasonic signals. Transmitter 1400 includes membrane 1403 formed on substrate 1401. Substrate 1401 can be patterned to include a channel 1405 beneath membrane 1403 that can extend to the bottom side of substrate 1401. Channel 1405 can further extend up through substrate 1401 as shown in FIG. 14. In this way, as membrane 1403 vibrates up and down, air can be pushed up and away from transmitter 1400 when membrane 1403 flexes in the upward direction, and can force air out and away from transmitter 1400 via channel 1405 when membrane 1403 flexes in the downward direction. This design can produce higher SPLs than would be otherwise possible with conventional substrate designs. Substrate 1401 having channel 1405 can be used in combination with any of the transmitters disclosed herein.

Figure 15:
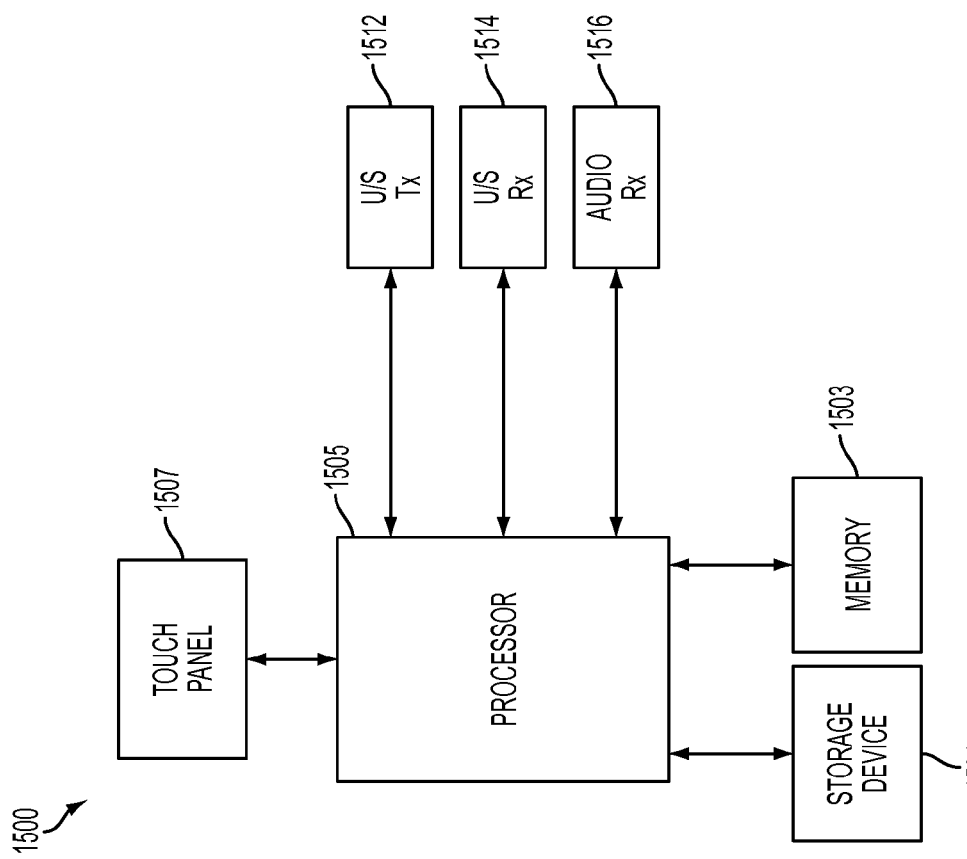
FIG. 15 illustrates a computing system having an ultrasonic transmitter according to various examples of the disclosure.

Ultrasonic ranging can operate in a system similar or identical to system 1500 shown in FIG. 15. System 1500 can include instructions stored in a non-transitory computer readable storage medium, such as memory 1503 or storage device 1501, and executed by processor 1505. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The system 1500 can further include ultrasonic transmitter 1512, ultrasonic receiver 1514, and audio receiver 1516 coupled to the processor 1505. The transmitter 1512 can include any of those described in FIGS. 4 through 14. The processor 1505 can process inputs to the transmitter 1512 and outputs from the receivers 1514, 1516 to perform actions based on ranges and other data associated with proximate devices.

The system 1500 can include touch panel 1507 coupled to the processor 1505. Touch panel 1507 can have touch nodes capable of detecting an object touching or hovering over the panel. The processor 1505 can process the outputs from the touch panel 1507 to perform actions based on the touch or hover event.

It is to be understood that the system is not limited to the components and configuration of FIG. 15, but can include other or additional components in multiple configurations according to various examples. Additionally, the components of system 1500 can be included within a single device, or can be distributed between multiple devices. In some examples, the processor 1505 can be located within the touch panel 1507 and/or the imaging range finder 1509.

Figure 16:
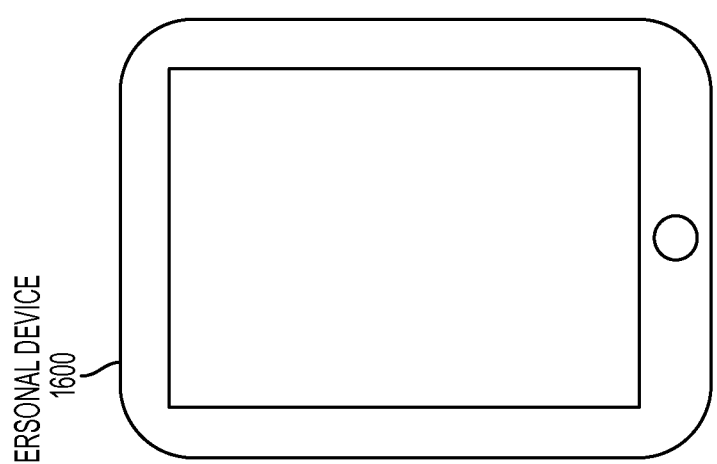
FIG. 16 illustrates a mobile device that can include an ultrasonic transmitter according to various examples of the disclosure.

FIG. 16 illustrates an exemplary mobile device 1600, such as a tablet computer, that can include one or more ultrasonic transmitters according to various examples.

Figure 17:
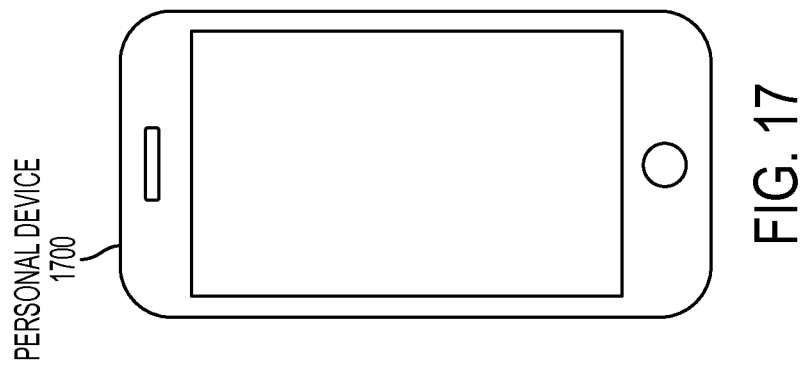
FIG. 17 illustrates another mobile device that can include an ultrasonic transmitter according to various examples of the disclosure.

FIG. 17 illustrates an exemplary mobile device 1700, such as a mobile phone or personal media player, that can include one or more ultrasonic transmitters according to various examples.

FIG. 18 illustrates an exemplary personal computer 1800 that can include one or more ultrasonic transmitters according to various examples.

While not shown, it should be appreciated that ultrasonic transmitters according to various examples described herein can also be used in other devices, such as televisions, peripheral television devices, and the like.

Therefore, according to the above, some examples of the disclosure are directed to a device comprising: a first set of transmitters configured to transmit an ultrasonic signal having a frequency within a first frequency band; and a second set of transmitters configured to transmit an ultrasonic signal having a frequency within a second frequency band. Additionally or alternatively to one or more of the examples disclosed above, the first frequency band can include frequencies between 45-55 kHz. Additionally or alternatively to one or more of the examples disclosed above, the second frequency band can include frequencies between 60-70 kHz. Additionally or alternatively to one or more of the examples disclosed above, the device can further include a third set of transmitters configured to transmit an ultrasonic signal having a frequency within a third frequency band. Additionally or alternatively to one or more of the examples disclosed above, the first, second, and third sets of transmitters can be formed on the same die substrate. Additionally or alternatively to one or more of the examples disclosed above, the first, second, and third sets of transmitters can each be formed on a different die substrate. Additionally or alternatively to one or more of the examples disclosed above, the third frequency band can include frequencies between 85-95 kHz. Additionally or alternatively to one or more of the examples disclosed above, the device can further include a fourth set of transmitters configured to transmit an ultrasonic signal having a frequency within a fourth frequency band. Additionally or alternatively to one or more of the examples disclosed above, each of the first, second, and third sets of transmitters can be configured to transmit signals in two or more different channels within their respective frequency bands.

Some examples of the disclosure are directed to a transmitter comprising: a drum; a membrane coupled to the drum; a first electrode coupled to the drum; a second electrode coupled to the membrane; and a plurality of posts disposed within the drum, wherein the plurality of posts can have non-uniform heights. Additionally or alternatively to one or more of the examples disclosed above, the membrane can be configured to transmit an ultrasonic signal at a first frequency when a signal having a first DC voltage component is applied to the first electrode and the membrane can be further configured to transmit an ultrasonic signal at a second frequency when a signal having a second DC voltage component is applied to the second electrode. Additionally or alternatively to one or more of the examples disclosed above, a height of a first post of the plurality of posts can be less than a height of a second post of the plurality of posts, wherein the first post can be positioned closer to the center of the membrane than the second post. Additionally or alternatively to one or more of the examples disclosed above, the membrane can be configured to contact the second post when the signal having the first DC voltage component is applied to the first electrode, wherein the membrane can be configured to contact the first post when the signal having the second DC voltage component is applied to the first electrode. Additionally or alternatively to one or more of the examples disclosed above, the membrane can be circular in shape and each of the plurality of posts form concentric circles within the drum. Additionally or alternatively to one or more of the examples disclosed above, the transmitter can be a MEMS transmitter. Additionally or alternatively to one or more of the examples disclosed above, the transmitter can be enclosed within a housing, wherein the housing can include one or more dividers to control the flow of air out of the housing.

Some examples of the disclosure are directed to a transmitter comprising: a drum; a first membrane coupled to the drum; a second membrane coupled to the drum; a first electrode coupled to the drum; a second electrode coupled to the first membrane; a third electrode coupled to the first membrane opposite the second electrode; and a fourth electrode coupled to the second membrane, wherein the first membrane can be separate from the second membrane when a signal having a first DC voltage component is applied to the third electrode, and wherein the first membrane and second membrane can be coupled together when a signal having a second DC voltage component is applied to the third electrode. Additionally or alternatively to one or more of the examples disclosed above, the transmitter can be configured to transmit an ultrasonic signal having a first frequency when the signal having the first DC voltage component is applied to the third electrode and the transmitter can be further configured to transmit an ultrasonic signal having a second frequency when the signal having the second DC voltage component is applied to the third electrode.

Some examples of the disclosure are directed to a transmitter comprising: a drum; a membrane coupled to the drum, the membrane having a non-uniform shape; a first electrode coupled to the drum; and a second electrode coupled to the membrane, wherein the membrane can be configured to transmit an ultrasonic signal having a first frequency in response to applying a first signal to the first electrode, and wherein the membrane can be configured to transmit an ultrasonic signal having a second frequency in response to applying a second signal to the first electrode. Additionally or alternatively to one or more of the examples disclosed above, the non-uniform shape can be an oval. Additionally or alternatively to one or more of the examples disclosed above, the non-uniform shape can be a rectangle. Additionally or alternatively to one or more of the examples disclosed above, the transmitter can further include a third electrode and a fourth electrode coupled to opposite ends of the membrane along the length of the membrane. Additionally or alternatively to one or more of the examples disclosed above, the transmitter can further include a third electrode and a fourth electrode coupled to opposite ends of the membrane along the width of the membrane. Additionally or alternatively to one or more of the examples disclosed above, the transmitter can be included within a mobile phone, tablet computer, portable media player, or laptop computer.

Some examples of the disclosure are directed to a transmitter comprising: a patterned die substrate; and a membrane formed on a first side of the die substrate, wherein the patterned die can include a channel disposed beneath the membrane, and wherein the channel can extends from the from the first side of the die substrate to a second side of the die substrate opposite the first side, along the second side of the die substrate, and from the second side of the die substrate to the first side of the die substrate.

Although examples have been fully described with reference to the accompanying drawings, it is to be noted that various changes and modifications will become apparent to those skilled in the art. For example, other steps may be provided, or steps may be eliminated, from the described flows, and other components may be added to, or removed from, the described devices. Such changes and modifications are to be understood as being included within the scope of the various examples as defined in this Detailed Description and by the appended claims.

What is claimed is:

1. A transmitter comprising:
a drum;
a membrane coupled to the drum;
a first electrode coupled to the drum;
a second electrode coupled to the membrane; and
a plurality of posts disposed within the drum, wherein the plurality of posts have non-uniform heights such that:
while the membrane is in a first configuration, a first post of the plurality of posts causes the membrane to have a first length; and
while the membrane is in a second configuration, a second post of the plurality of posts causes the membrane to have a second length, different from the first length;
wherein the membrane is configured to transmit an ultrasonic signal at a first frequency, corresponding to the first length, when a signal having a first DC voltage component is applied to the first electrode, and wherein the membrane is configured to transmit an ultrasonic signal at a second frequency, corresponding to the second length, when a signal having a second DC voltage component is applied to the first electrode.

2. The transmitter of claim 1, wherein a height of the first post of the plurality of posts is less than a height of the second post of the plurality of posts, and wherein the first post is positioned closer to a center of the membrane than the second post.

3. The transmitter of claim 2, wherein the membrane is configured to contact the first post when the signal having the first DC voltage component is applied to the first electrode, and wherein the membrane is configured to contact the second post when the signal having the second DC voltage component is applied to the first electrode.

4. The transmitter of claim 1, wherein the membrane is circular in shape, and wherein each of the plurality of posts form concentric circles within the drum.

5. The transmitter of claim 1, wherein the transmitter is a microelectromechanical system (MEMS) transmitter.

6. The transmitter of claim 1 wherein the transmitter is enclosed within a housing, and wherein the housing comprises one or more dividers to control flow of air out of the housing.

7. A transmitter comprising:
a drum;
a first membrane coupled to the drum;
a second membrane coupled to the drum;
a first electrode coupled to the drum;
a second electrode coupled to the first membrane;
a third electrode coupled to the first membrane opposite the second electrode; and
a fourth electrode coupled to the second membrane, wherein the first membrane is separate from the second membrane when a signal having a first DC voltage component is applied to the third electrode, and wherein the first membrane and second membrane are coupled together when a signal having a second DC voltage component is applied to the third electrode.

8. The transmitter of claim 7, wherein the transmitter is configured to transmit an ultrasonic signal having a first frequency when the signal having the first DC voltage component is applied to the third electrode, and wherein the transmitter is configured to transmit an ultrasonic signal having a second frequency when the signal having the second DC voltage component is applied to the third electrode.

9. A transmitter comprising:
a drum;
a membrane coupled to the drum, the membrane having a shape including a length and a width, wherein the width is shorter than the length;
a first electrode coupled to the drum; and
a second electrode coupled to the membrane, wherein the membrane is configured to transmit an ultrasonic signal having a first frequency, corresponding to the width, in response to applying a first signal to the first electrode, and wherein the membrane is configured to transmit an ultrasonic signal having a second frequency, corresponding to the length, in response to applying a second signal to the first electrode.

10. The transmitter of claim 9, wherein the shape is an oval.

11. The transmitter of claim 9, wherein the shape is a rectangle.

12. The transmitter of claim 9, wherein the transmitter further comprises a third electrode and a fourth electrode coupled to opposite ends of the membrane along the length of the membrane.

13. The transmitter of claim 9, wherein the transmitter further comprises a third electrode and a fourth electrode coupled to opposite ends of the membrane along the width of the membrane.

14. The transmitter of claim 9, wherein the transmitter is included within a mobile phone, a tablet computer, a portable media player, or a laptop computer.

15. A method of transmitting at different frequencies using a transmitter comprising a drum, a membrane coupled to the drum, a first electrode coupled to the drum, a second electrode coupled to the membrane, and a plurality of posts of non-uniform height disposed within the drum, the method comprising:
applying a first DC voltage component to the first electrode such that a first post of the plurality of posts causes the membrane to have a first length;
transmitting an ultrasonic signal at a first frequency corresponding to the first length;
applying a second DC voltage component to the first electrode such that a second post of the plurality of posts causes the membrane to have a second length; and
transmitting an ultrasonic signal at a second frequency corresponding to the second length.

16. The method of claim 15, wherein a height of the first post of the plurality of posts is less than a height of the second post of the plurality of posts, and wherein the first post is positioned closer to a center of the membrane than the second post.

17. The method of claim 16, wherein applying the first DC voltage component to the first electrode causes the membrane to contact the first post, and wherein applying the second DC voltage component to the first electrode causes the membrane to contact the second post.

18. The method of claim 15, wherein the membrane is circular in shape, and wherein each of the plurality of posts form concentric circles within the drum.

19. The method of claim 15, wherein the transmitter is a microelectromechanical system (MEMS) transmitter.

20. The method of claim 15 wherein the transmitter is enclosed within a housing, and wherein the housing comprises one or more dividers to control flow of air out of the housing.

21. A method of transmitting at different frequencies using a transmitter comprising a drum, a first membrane coupled to the drum, a second membrane coupled to the drum, a first electrode coupled to the drum, a second electrode coupled to the first membrane, a third electrode coupled to the first membrane opposite the second electrode, and a fourth electrode coupled to the second membrane, the method comprising:
applying a first DC voltage component to the third electrode such that the first membrane is separate from the second membrane; and
applying a second DC voltage component to the third electrode such that the first membrane and second membrane are coupled together.

22. The method of claim 21, further comprising:
transmitting an ultrasonic signal having a first frequency when the signal having the first DC voltage component is applied to the third electrode; and
transmitting an ultrasonic signal having a second frequency when the signal having the second DC voltage component is applied to the third electrode.

* * * * *